(12) United States Patent
Nishizawa (10) Patent No.: US 7,679,674 B2
(45) Date of Patent: Mar. 16, 2010

(54) CAMERA HOUSING

(75) Inventor: Akio Nishizawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 645 days.

(21) Appl. No.: 11/502,447

(22) Filed: Aug. 11, 2006

(65) Prior Publication Data

US 2007/0040931 A1    Feb. 22, 2007

(30) Foreign Application Priority Data

Aug. 16, 2005   (JP) .............................. 2005-236051

(51) Int. Cl.
 *H04N 5/225*   (2006.01)
(52) U.S. Cl. .............................. 348/376; 348/81; 396/27
(58) Field of Classification Search ............ 348/81–85, 348/333.01–333.13, 373–376; 396/25, 27–29, 396/535–537, 543; 345/173, 179; D16/204
See application file for complete search history.

(56) References Cited

U.S. PATENT DOCUMENTS

| 7,385,645 | B2 * | 6/2008 | Boon .......................... 348/373 |
| 2004/0076415 | A1 * | 4/2004 | Da Silva ....................... 396/25 |
| 2006/0008262 | A1 * | 1/2006 | Watanabe et al. ............. 396/25 |
| 2006/0033720 | A1 * | 2/2006 | Robbins et al. ............. 345/173 |
| 2006/0256090 | A1 * | 11/2006 | Huppi ......................... 345/173 |

FOREIGN PATENT DOCUMENTS

| JP | 2001-351464 | 12/2001 |
| JP | 2002-287851 | 10/2002 |
| JP | 2002287851 A * | 10/2002 |
| JP | 2004-004255 | 1/2004 |

OTHER PUBLICATIONS

"Major Resin Types," internet webpage from http://www.specialchem4coatings.com/tc/powder-coatings/index.aspx?id=resin.*

Japanese Patent Office Notice of Reasons for Rejection, mailed Jul. 14, 2009 and issued in corresponding Japanese Patent Application No. 2005-236051.

Japanese Patent Office Notice of Reasons for Rejection, mailed Dec. 8, 2009 and issued in corresponding Japanese Patent Application No. 2005-236051.

* cited by examiner

*Primary Examiner*—Lin Ye
*Assistant Examiner*—Dennis Hogue

(57) ABSTRACT

Providing a camera housing which is suitably used to house a camera with a liquid crystal monitor having a touch panel and is capable of preventing the touch panel from being broken. The camera housing includes, an external operation unit provided outside the camera housing, a contact member provided inside the camera housing for operating the touch panel by contacting the touch panel, and an elastic member provided between the external operation unit and the contact member for transmitting pressing force which is applied on the external operation unit to the contact member.

9 Claims, 6 Drawing Sheets

CAMERA HOUSING

This application claims the benefit of Japanese Patent Application No. 2005-236051 which is hereby incorporated by reference.

BACKGROUND OF THE INVENTION

1. Field of the Invention

The present invention relates to a camera housing for housing a digital camera or a video camera to perform an underwater photographing operation or the like.

2. Related Background

In these years, a digital camera or a video camera has a smaller space for installing therein an operation button and the like, because of recently increasing size of a liquid crystal monitor and the reduced size of the whole camera apparatus. In order to cope with this problem, there is proposed a camera which is provided with a liquid crystal monitor having a touch panel. There is further proposed a camera housing for housing such a camera, as disclosed, for example, in Japanese Patent Application Laid-Open No. 2002-287851.

However, in such a camera housing as disclosed in Japanese Patent Application Laid-Open No. 2002-287851, a portion which comes to face the liquid crystal monitor of the camera when the camera is housed is constituted of a flexible material as an input panel. It is arranged such that this flexible input panel is directly shoved to be in contact with the touch panel, thereby operating the touch panel. For this reason, there arises a problem that when the input panel is shoved strongly, the touch panel might be broken. In addition, such a camera housing is not suitable to be used deep underwater where the input panel must receive great hydraulic pressure.

SUMMARY OF THE INVENTION

Accordingly, the present invention has been contrived the above-described problem into consideration, and an object thereof is to provide a camera housing which is suitably used to house a camera with a liquid crystal monitor having a touch panel and is capable of preventing the touch panel from being broken.

In order to solve the above-described problem, according to the present invention, there is provided a camera housing for housing a camera with a display portion having a touch panel, including:

an external operation unit provided outside the camera housing;

a contact member provided inside the camera housing for operating the touch panel by contacting the touch panel; and an elastic member provided between the external operation unit and the contact member for transmitting pressing force which is applied on the external operation unit to the contact member.

The camera housing of the present invention is characterized in that the elastic member is adapted to restrict the pressing force to be transmitted to the contact member.

The camera housing of the present invention is also characterized in that the contact member is formed of transparent resin.

Also, the camera housing of the present invention is characterized in that the external operation unit and the elastic member are provided at positions off a portion which faces the display portion in the camera housing when the camera is housed in the camera housing.

According to the present invention, it is possible to provide a camera housing which is suitably used to house a camera with a liquid crystal monitor having a touch panel and is capable of preventing a touch panel from being broken.

DETAILED DESCRIPTION OF THE MOST PREFERRED EMBODIMENTS

A camera housing according to an embodiment of the present invention will be described in detailed with reference to the attached drawings.

Figure 1:
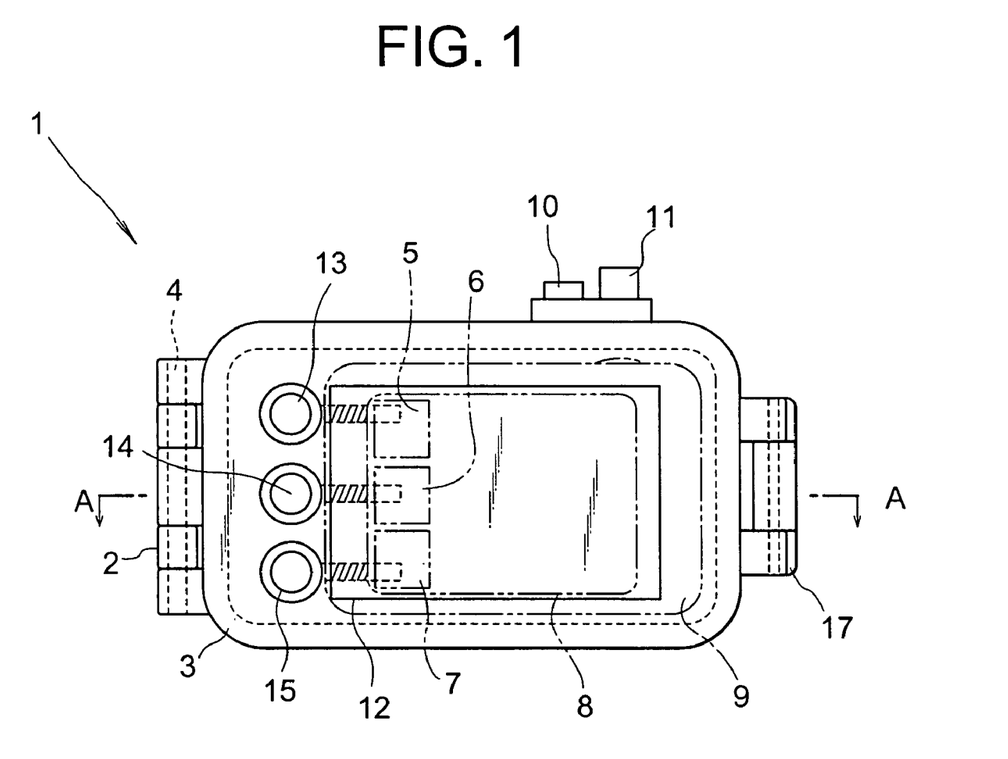
FIG. 1 is a view for showing the external appearance of a camera housing according to an embodiment of the present invention.
Figure 2A:
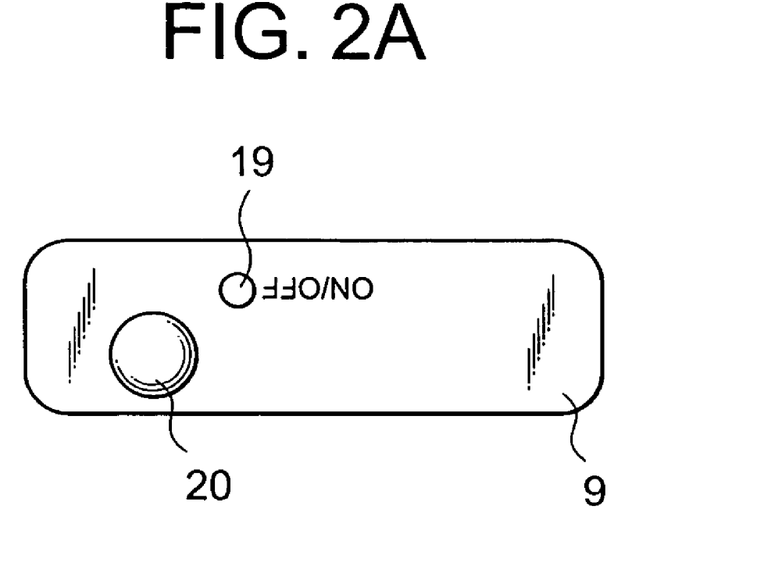
FIGS. 2A and 2B are a plan view and a front view for showing the external appearance of a digital camera to be housed in the camera housing according to the embodiment of the present invention.
Figure 2B:
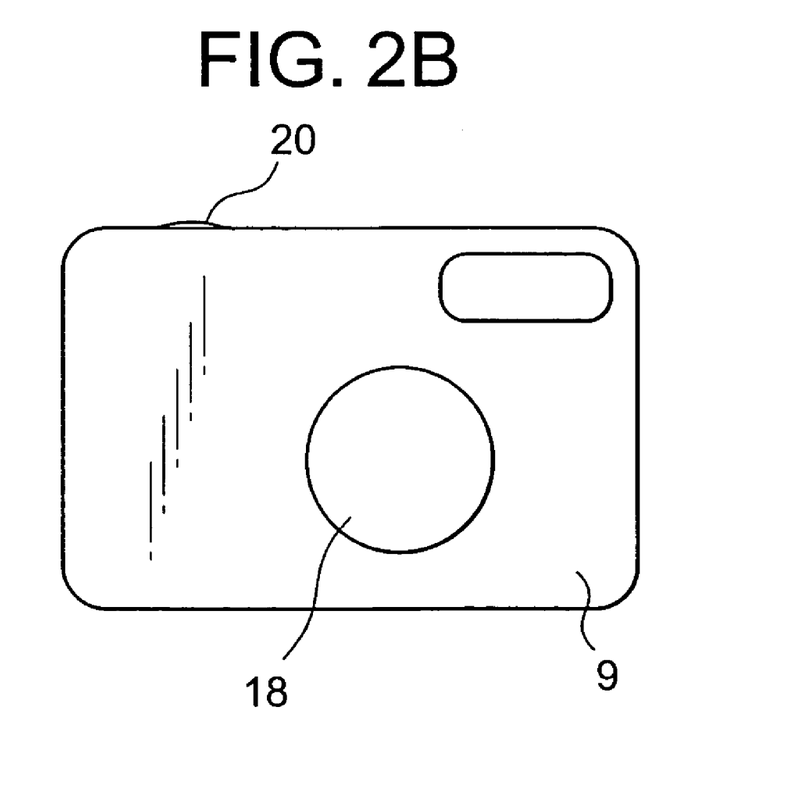

FIG. 1 is a view for showing an external appearance of a camera housing according to an embodiment of the present invention.

The camera housing 1 according to the present embodiment is suitably adapted to house a camera which is provided with a liquid crystal monitor having touch panels and is composed of, as shown in FIG. 1, a front cover 2 and a rear cover 3, which are connected to the camera housing to be openable and closable via a hinge 4. The front cover 2 and the rear cover 3 are formed of transparent materials. Note that FIG. 1 shows a case that this camera housing 1 houses a digital camera 9 (which will be described later) provided with a liquid crystal monitor 8 having touch panels 5, 6 and 7.

On front surface of the front cover 2, a power source button 10 and a shutter button 11 are respectively provided at the top, and the user can operate a power source button and a shutter button of the digital camera 9 through this power source button 10 and the shutter button 11.

On the back side of the rear cover 3, there are provided a window 12 for a liquid crystal monitor for visually confirming the liquid crystal monitor 8 of the digital camera 9 from outside the housing 1, and operation buttons 13, 14 and 15 for operating the touch panels 5, 6 and 7 of the liquid crystal monitor 8 (which buttons will be described in detail later). Note that the window 12 for the liquid crystal monitor is formed of transparent material and is provided to be corresponding to the position and the size of the liquid crystal monitor 8 of the digital camera 9.

Figure 4A:
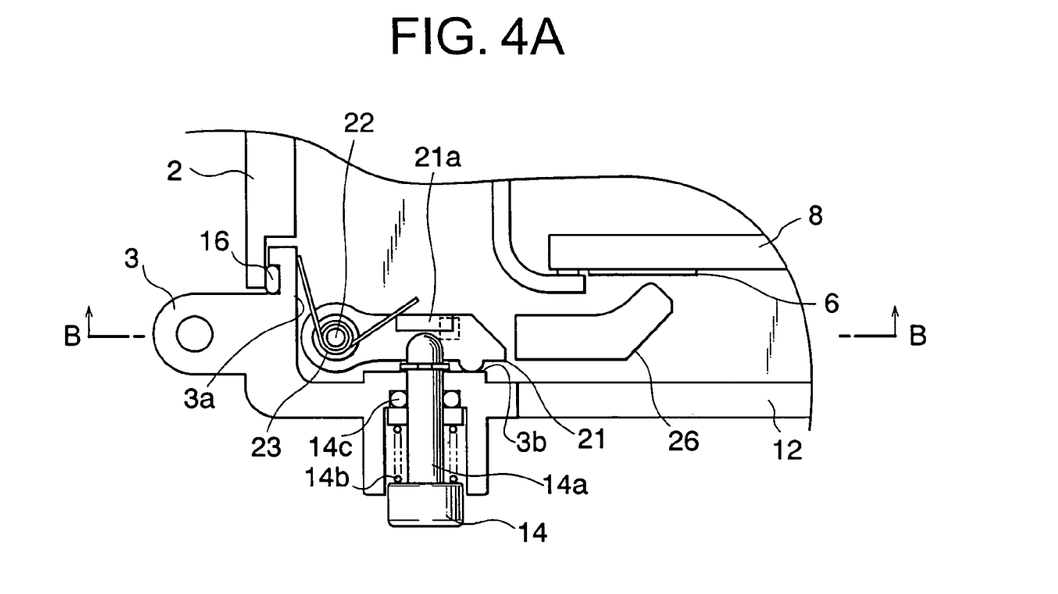
FIGS. 4A and 4B are views of essential members around a section along A-A in FIG. 1, for showing in an enlarged manner a constitution of an operation button in the camera housing according to the embodiment of the present invention.
Figure 4B:
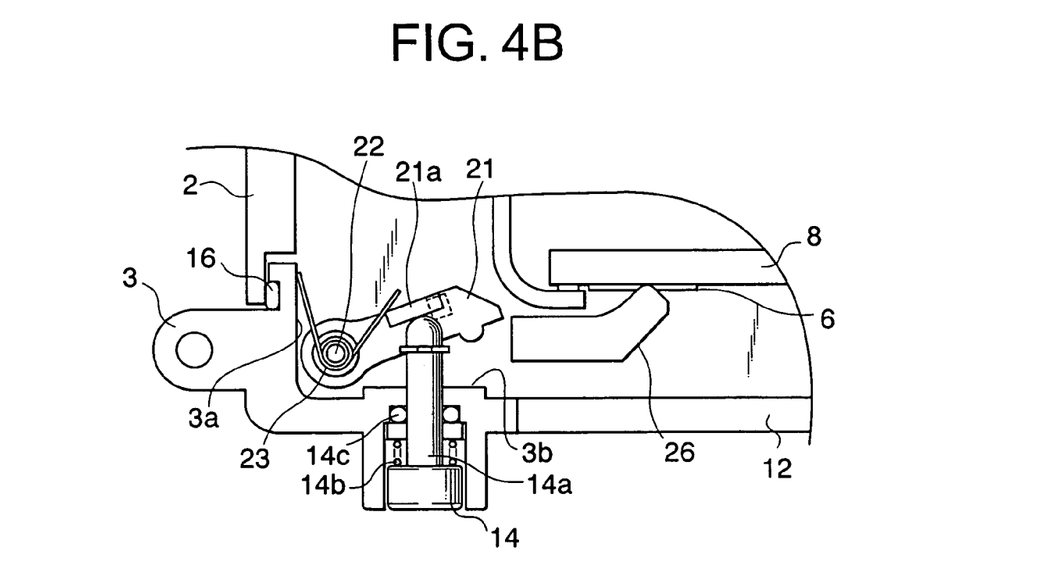

A seal rubber 16 is fitted in all along the entire contact surface between the rear cover 3 and the front cover 2, that is, along the entire outer periphery of an end portion of the rear cover 3 on the side of the front cover 2, as shown in FIGS. 4A and 4B which will be described more detailedly later. Thus, when the digital camera 9 is housed and the front cover 2 and the rear cover 3 are fastened and secured by a buckle 17, the housing 1 is sealed up to complete a waterproofing state. With the above-described arrangement, it is rendered possible to use the digital camera 9 housed in this housing 1 underwater.

FIGS. 2A and 2B and FIGS. 3A to 3C are a plan view, a front view, and back-side views respectively for showing the external appearance of a digital camera to be housed in the camera housing according to the embodiment of the present invention.

The digital camera 9 shown in FIGS. 2A and 2B and FIGS. 3A to 3C is a common digital camera which can be used in itself aboveground, and is provided with a lens 18 on its front surface, a power source button 19 and a shutter button 20 on its upper surface, and a liquid crystal monitor 8 with the touch panels 5, 6 and 7 on the back side thereof.

Figure 3A:
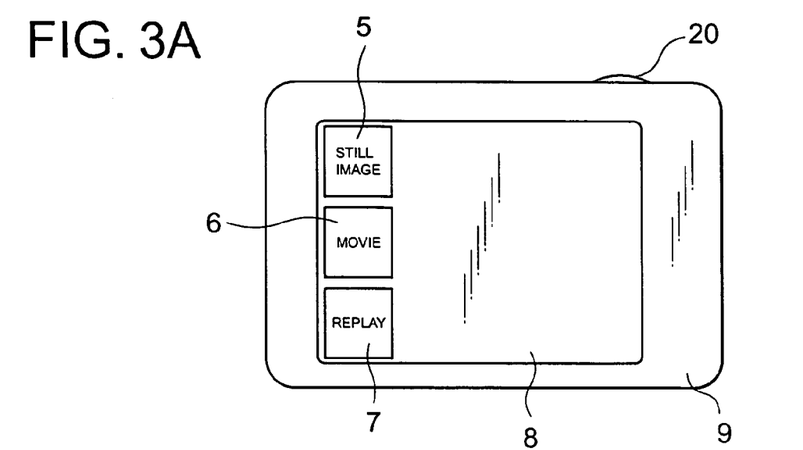
FIGS. 3A to 3C are back-side views for showing the external appearance of the digital camera to be housed in the camera housing according to the embodiment of the present invention (for showing examples of changes of icon display when the touch panel is operated by a user)
Figure 3B:
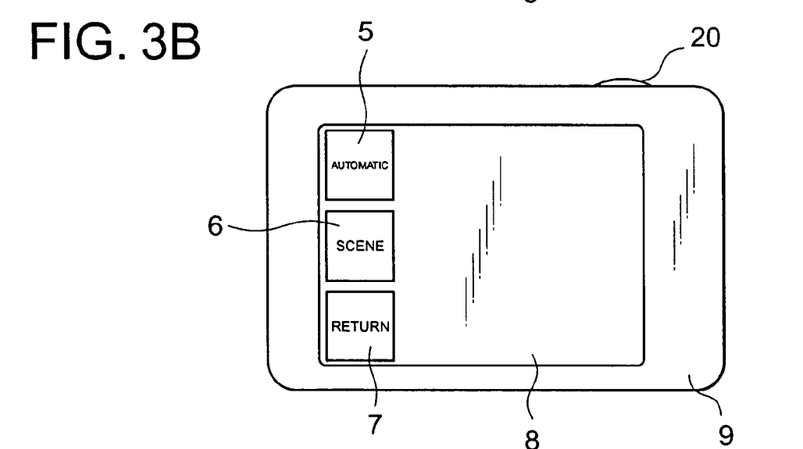
Figure 3C:
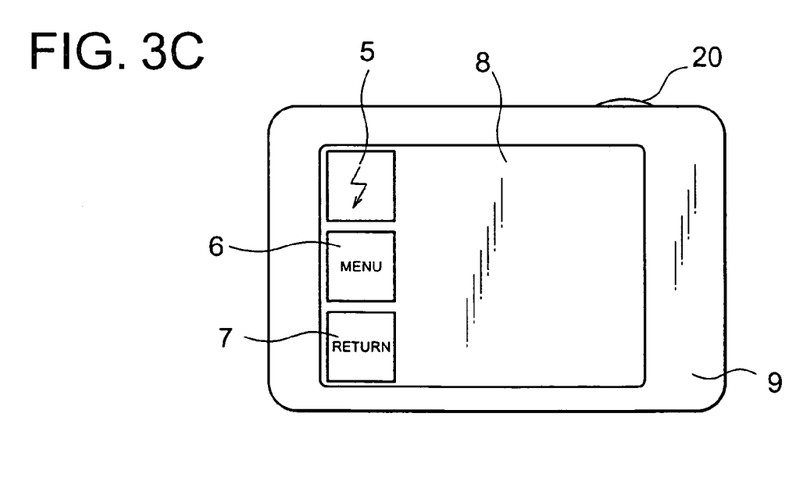

Note that FIGS. 3A to 3C show examples of changes of icon display when the touch panels 5, 6 and 7 are operated by a user.

The touch panels 5, 6 and 7 are disposed on the left side of the monitor screen of the liquid crystal monitor 8. Immediately after the power of the digital camera 9 is turned on, "STILL IMAGE", "MOVIE" and "REPLAY" are displayed on this liquid crystal monitor 8, as shown in FIG. 3A, to be corresponding to the touch panels 5, 6 and 7, thereby prompting to select a mode to be used. In this case, if the "STILL IMAGE" is selected with the touch panel 5, "AUTOMATIC", "SCENE" and "RETURN" are displayed correspondingly to the touch panels 5, 6 and 7, as shown in FIG. 3B, thereby prompting the user to select a photographing mode. Furthermore, if the "AUTOMATIC" is selected with the touch panel 5, "↓(flash mark)", "MENU" and "RETURN" are displayed correspondingly to the touch panels 5, 6 and 7, as shown in FIG. 3C. In this case, the user can photograph by pressing the shutter button 20 or can change the set mode for flashing (prohibition of light emission, or the like) by selecting the "↓(flash mark)". Also, if the "MENU" is selected, displays are switched over to those for performing detailed setup of various types. Meanwhile, the previously displayed items can be displayed again if the "RETURN" is selected.

The operation buttons 13, 14 and 15, which are most characteristic arrangements of this camera housing 1 which houses the digital camera 9 with such a structure, will be described below.

Figure 5A:
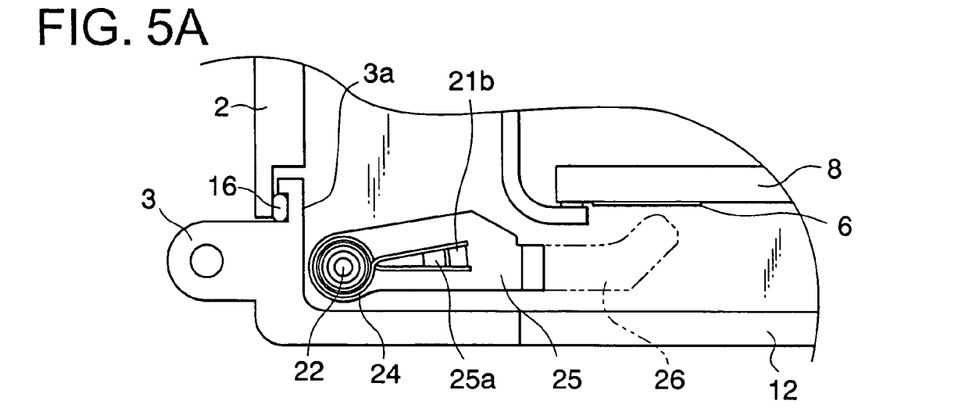
FIGS. 5A to 5C are views of the essential members around a section along A-A in FIG. 1, for showing in an enlarged manner a constitution of the operation button in the camera housing according to the embodiment of the present invention.
Figure 5B:
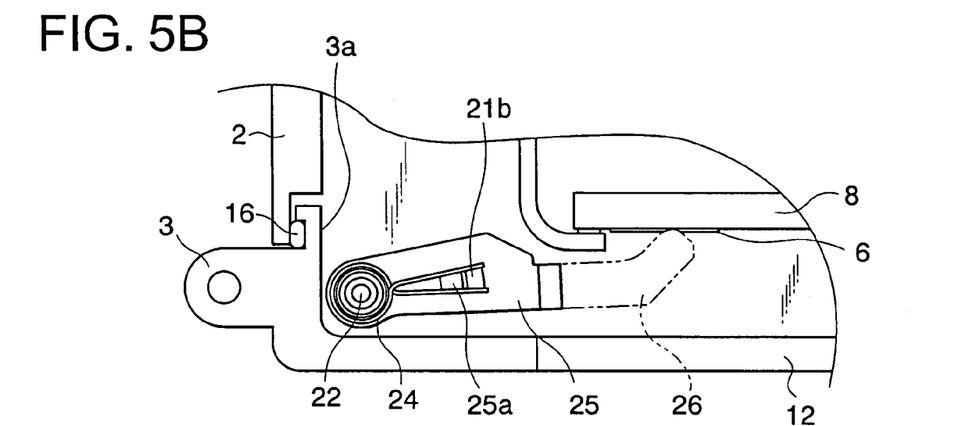
Figure 5C:
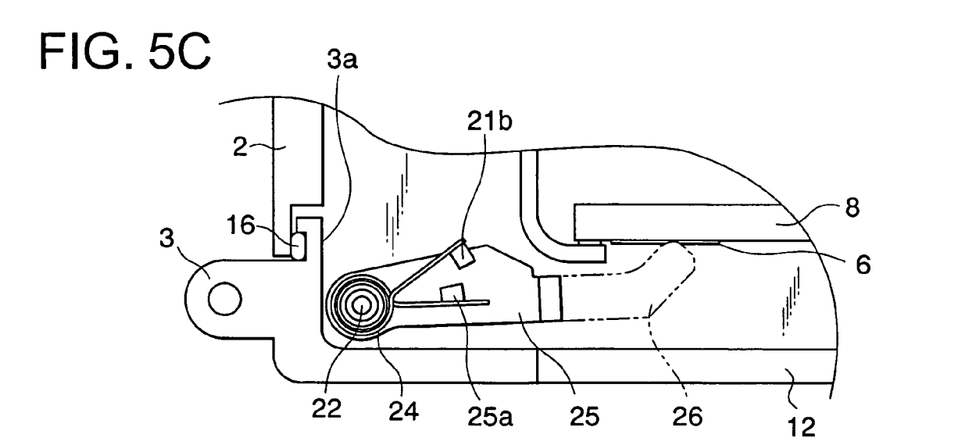
Figure 6:
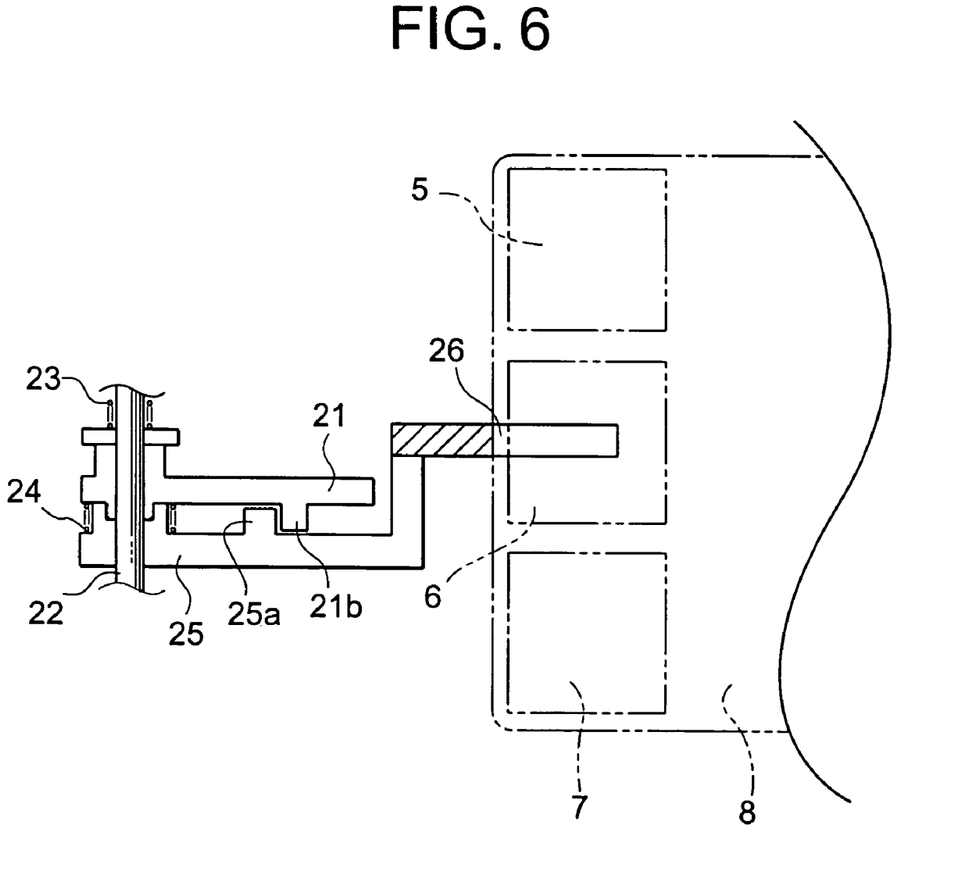
FIG. 6 is a view of the essential members around a section along B-B in FIG. 4A, for showing in an enlarged manner a constitution of an operation button in the camera housing according to the embodiment of the present invention.

FIGS. 4A and 4B, FIGS. 5A to 5C and FIG. 6 are views for showing the constitutions of operation buttons in the camera housing according to the embodiment of the present invention. More specifically, FIGS. 4A and 4B and FIGS. 5A to 5C are enlarged views of essential members around a section along A-A in FIG. 1, and FIG. 6 is an enlarged view of the essential members around a section along B-B in FIG. 4A.

As shown in FIG. 4B, the operation button 14, which is biased outwardly, that is, downwardly in FIG. 4B, by a spring 14b, is disposed to be thrust into the rear cover 3 in such a manner that the tip end of the shaft 14a of the operation button 14 is brought into contact with a projection 21a of an upper member 21, which will be described later, when this button is shoved by the user so that the upper member 21 can be shoved inwardly. Note that an O ring 14c is provided between the shaft 14a of the operation button 14 and the rear cover 3 as being kept waterproofed.

A shaft 22 extending upward is provided near a corner inside the rear cover 3, and this shaft 22 supports, as shown in FIG. 6, a torsion spring 23, the upper member 21, a torsion spring 24 and a lower member 25 in the order from the top to be rotatable, respectively.

The upper member 21 is a long and narrow plate-like member which is extended in the horizontal direction from the shaft 22, and the projection 21a with which the tip end of the shaft 14a of the operation button 14 described above is brought into contact is integrally formed on the upper side of the upper member 21. Another projection 21b is also integrally formed on the lower side of the upper member 21.

Then, one of the arms of the torsion spring 23 is in contact with an inner wall 3a of the rear cover 3, and the other is in contact with the projection 21a of the upper member 21. With this arrangement, the upper member 21 is biased in the clockwise direction through the projection 21a to be pressed upon an inner wall 3b of the rear cover 3.

The lower member 25 is an L-shaped plate-like member which is extended longer than the upper member 21 in the horizontal direction from the shaft 22, with the tip end portion bent upwardly. A projection 25a is integrally formed on the upper side of the lower member 25. Further, a contact member 26 which will be described later is integrally formed at the tip end of the upwardly bent portion.

The projection 21b of the upper member 21 and the projection 25a of the lower member 25 are disposed between the two arms of the torsion spring 24, whereby the projection 21b and the projection 25a are biased to be pinched between the two arms from both sides. As a result, the positional relation of the upper member 21 and the lower member 25 are fixed.

The contact member 26 is brought into contact with the touch panel 6 which is provided in the liquid crystal monitor 8 of the digital camera 9 so as to operate this touch panel 6. The tip end portion of the contact member 26 which is directly in contact with the touch panel 6 is formed to be inclined toward the liquid crystal panel 8, seen from the above. Then, as described above, the positional relation of the upper member 21 and the lower member 25 are fixed by the torsion spring 24 and, moreover, the upper member 21 is biased in the clockwise direction by the torsion spring 23, so that both the lower member 25 and the upper member 21 are biased in the clockwise direction and the contact member 26 is kept from being in contact with the touch panel 6.

Such a contact member 26 is wholly formed of transparent resin (polycarbonate in this embodiment), so as not to obstruct the display on the liquid crystal monitor 8.

Further, a part of a side surface of the contact member 26 on the side of the rear cover 3, more specifically, a part of a side surface of the contact member 26 on the side of the rear cover 3 which is not superposed on the liquid crystal monitor 8 (the slating line portions in FIG. 1 and FIG. 6) is constituted by a diffused surface such as a granulated surface. With this arrangement, part of light coming from the liquid crystal monitor 8 travels inside the contact member 26 to be emitted from the diffused surface. That is, a part between the operation button 14 and the touch panel 6 in the housing 1 seems luminous to the user. As a result, the user can easily see the positional relation between the operation button 14 and the touch panel 6, which is more effective when a large number of operation buttons are provided.

In the above-described constitution, when the operation button 14 is pressed by the user, the tip end of the shaft 14a of the operation button 14 is brought into contact with the projection 21a of the upper member 21 and the pressing force is applied thereon, whereby the upper member 21 is rotated inwardly around the shaft 22. In this case, since being fixed to the upper member 21 by the torsion spring 24, the lower member 25 is also rotated inwardly together with the upper member 21, as shown in FIG. 5B. With this operation, the contact member 26 on the side of the upper member 25 is brought into contact with the touch panel 6 to achieve a touch panel operation. Note that, when the user releases the operation button 14 after the touch panel operation, the respective members are biased by the torsion springs 23 and 24 and the spring 14b, so that the state prior to the pressing of the operation button 14 is returned (the state shown in FIG. 4A).

As described above, the pressing force applied on the operation button 14 is transmitted to the contact member 26 via the torsion spring 24 so that the contact member 26 is brought into direct contact with the touch panel 6, whereby an operation of the touch panel 6 by means of the operation button 14 can be achieved.

Here, when the operation button 14 is further pressed with great pressing force, as shown in FIG. 4B, the upper member 21 is further rotated around the shaft 22, and on this occasion, the positional relation between the projection 21b and the projection 25a which is kept by the torsion spring 24 is broken, whereby the projection 21b shoves one of the arms of the torsion spring 24 in a direction opposite to the biasing direction, as shown in FIG. 5C.

The torsion spring 24 is deformed so that, when a great force is applied in the direction opposite to the biasing direction on one of the arms thereof, as described above, the biasing force of the other of the arms does not become excessively great. For this reason, the biasing force applied on the projection 25a of the lower member 25 does not exceed a predetermined value (a value which does not break the panel).

Accordingly, even when the operation button 14 is pressed with a strong pressing force (i.e., in a large pressing amount), the pressing force is restricted within a limit which prevents the contact member 26 from breaking the touch panel 6 with the torsion spring 24. As a result, the contact member 26 does not contact the touch panel 6 strongly, so as to prevent destruction of the touch panel 6.

With the above-described arrangement, it is possible to securely obtain a sufficient pressing amount for pressing the operation button 14, so that a satisfactory operating feeling can be obtained even when the user wears, for example, gloves.

Note that, also in this case, like in the case after the touch panel operation described above, when the user releases the operation button 14, the respective members are biased by the torsion springs 23 and 24 and the spring 14b, and the state prior to the pressing of the operation button 14 is returned (the state shown in FIG. 4A).

The arrangement of the operation button 14 for operating the touch panel 6 is described above. However, the arrangements of the operation buttons 13, 15 which are corresponding to the touch panels 5 and 7 are the same as that of the operation button 14.

As described above, according to the present embodiment, it is possible to achieve a camera housing which is suitable for housing a camera having a liquid crystal monitor with touch panels and is capable of preventing the touch panels from being broken.

Also, according to the present embodiment, the contact member is formed of transparent resin, and the elements other than the contact member such as the operation buttons and the torsion springs are disposed at the positions off the portions facing the liquid crystal monitor in this housing, that is, at the positions separated from the window for the liquid crystal monitor, so as not to damage the display of the liquid crystal monitor.

It is also possible to see the positional relation between the operation button and the touch panels easily by making part of the contact member luminous, as described above.

Note that, though a waterproof camera housing to be used underwater is described in the present embodiment, the present invention is not limited to this, but can be applied to a dust-proofing camera housing and the like.

Also, though the torsion spring is used as the elastic member in the present embodiment, the present invention is not limited to this. For example, when an extension spring, a compression coil spring, or rubber is used as the elastic member and the contact member, the elastic member and the operation buttons are disposed on the touch panel in the order, the pressing force applied on the operation button can be reduced by the elastic member so as to prevent the touch panel from being broken.

What is claimed is:

1. A camera housing for housing a camera with a display portion includes a touch panel, comprising:
   an external operation unit including an externally operating member having an end portion located outside the camera housing to be externally operated and an other end portion located inside of the camera housing;
   a movement restriction unit that restricts an amount of movement of the externally operating member, said movement restricting unit including a first restricting member formed on the externally operating member and a second restricting member formed on the camera housing to oppose the first restricting member, whereby when said end portion of said externally operating member is externally operated to move inward the camera housing, the first restricting member approaches the second restricting member and is blocked thereby restricting a further movement of the externally operating member;
   a contact members, provided inside the camera housing, to operate said touch panel by contacting said touch panel; and
   an elastic member, disposed inside the camera housing and provided between said other end portion of said external operation unit and said contact member, to transmit a pressing force which is applied on said external operation unit, to said contact member.

2. A camera housing according to claim 1, wherein said elastic member is configured to restrict the contact member from further pressing on the touch panel, when the pressing force exceeds a predetermined value.

3. A camera housing according to claim 1 or 2, wherein said contact member is formed of transparent resin.

4. A camera housing according to claim 1 or 2, wherein said external operation unit and said elastic member are provided at positions outside said display portion as viewed in a direction in which the pressing force is applied, while said camera is housed in said camera housing.

5. A camera housing according to claim 1, wherein the elastic member is rotatably disposed inside the camera housing; and
   when the externally operating member is externally operated, the elastic member is rotated by being pushed by said other end portion of the externally operating member, thereby bringing the contact member into contact with the touch panel.

6. A camera housing according to claim 5, wherein the elastic member rotates around a shaft and includes a torsion spring.

7. A camera housing according to claim 6, wherein the torsion spring has projections on arms of the torsion spring, and the projections interleaf when the pressing force is applied.

8. A camera housing according to claim 6, wherein, if the pressing force exceeds a predetermined value, the elastic member dissipates an amount of force exceeding the predetermined value and does not further move the contact member towards the touch panel.

9. A camera housing for housing a camera with a display portion that includes a touch panel, comprising:

a push button outside said camera housing on which a user applies a pressing force towards inside of the camera housing to operate the touch panel;

a contact member, provided inside the camera housing, to move between a rest position in which the contact member is not in contact with said push button, and a contact position in which the contact member is in contact with said touch panel; and an elastic member to rotate upon receiving the pressing force from said push button, to push said contact member to move from the rest position to the contact position.

\* \* \* \* \*

UNITED STATES PATENT AND TRADEMARK OFFICE
CERTIFICATE OF CORRECTION

PATENT NO. : 7,679,674 B2
APPLICATION NO. : 11/502447
DATED : March 16, 2010
INVENTOR(S) : Akio Nishizawa It is certified that error appears in the above-identified patent and that said Letters Patent is hereby corrected as shown below:

Column 6, Line 40, change "a contact members," to --a contact member,--.

Signed and Sealed this

Thirteenth Day of July, 2010

David J. Kappos
*Director of the United States Patent and Trademark Office*